United States Patent [19]

Fujii et al.

[11] Patent Number: 5,321,076
[45] Date of Patent: Jun. 14, 1994

[54] COMPOSITION OF ETHYLENE-VINYL ACETATE COPOLYMERS

[75] Inventors: Yoshikazu Fujii, Nagoya; Senji Kusayama, Takarazuka; Eiji Matsuda, Osaka, all of Japan

[73] Assignee: Taoka Chemical Company, Limited, Osaka, Japan

[21] Appl. No.: 43,986

[22] Filed: Apr. 7, 1993

Related U.S. Application Data

[63] Continuation of Ser. No. 798,544, Nov. 26, 1991, abandoned.

[30] Foreign Application Priority Data

Nov. 30, 1990 [JP] Japan ................. 2-337149
Dec. 26, 1990 [JP] Japan ................. 2-418927
May 30, 1991 [JP] Japan ................. 3-155092

[51] Int. Cl.$^5$ .................................... C08G 63/91
[52] U.S. Cl. .......................... 525/61; 525/60; 524/503
[58] Field of Search .............. 525/60, 61; 524/292, 524/503

[56] References Cited

U.S. PATENT DOCUMENTS 3,911,053 10/1975 Wiest et al. ................. 525/60 X
4,352,749 10/1982 Nakabayashi et al. ........ 525/149
4,390,552 6/1983 Niwa ........................... 426/126
4,394,483 7/1983 Hobes et al. .................. 525/60
4,614,781 9/1986 Hori et al. ................... 525/330.6
4,885,105 12/1989 Yang et al. .................. 525/60 X

FOREIGN PATENT DOCUMENTS 0145928 6/1985 European Pat. Off. .
0014689 2/1977 Japan .
0174683 10/1983 Japan .

OTHER PUBLICATIONS

Chemical Abstracts, vol. 105, No. 12, Sep. 22, 1986, p. 52.
Chemical Abstracts, vol. 106, No. 24, Jun. 15, 1987, p. 74.

Primary Examiner—Joseph L. Schofer
Assistant Examiner—R. H. Delmendo
Attorney, Agent, or Firm—Birch, Stewart, Kolasch & Birch

[57] ABSTRACT

Ethylene-vinyl acetate copolymer compositions useful as adhesives, vibration-damping compositions or coating compositions which comprises a saponification product or a grafted saponification product of an ethylene-vinyl acetate copolymer and at least one aliphatic or aromatic polycarboxylic acid or anhydrides thereof.

6 Claims, No Drawings

COMPOSITION OF ETHYLENE-VINYL ACETATE COPOLYMERS

This application is a continuation of application Ser. No. 07/798,544 filed on Nov. 26, 1991, now abandoned.

The present invention relates to ethylene-vinyl acetate copolymer compositions useful as adhesives, vibration damper compositions and coating compositions.

Saponification products of ethylene-vinyl acetate copolymers are superior in adhesion, for example, to fibers and are widely used as hot-melt adhesives for fibrous materials (Journal of Japan Adhesive Association, Vol.10, No.1P 1-6 (1974) and Vol.15, No.4P 10-16(1979)). Recently, the saponification products of ethylene-vinyl acetate copolymers are used for interlayer (adhesive sheet) of laminated glasses, and for improvement of adhesion strength and heat stability of the interlayer. Use has also been found for grafted saponification products of ethylene-vinyl acetate copolymers prepared by grafting the above saponification products with ethylenically unsaturated carboxylic acids or anhydrides thereof (EPC Laid-Open Application No.0145928).

However, when these saponification products or grafted saponification products of ethylene-vinyl acetate copolymers are used for fibrous materials such as adhesive inner linings, they are insufficient in cleaning resistance and dry-cleaning resistance which are essential for adhesive inner linings, though practical peel strength is satisfied. Furthermore, there have been proposed various methods of using the saponificaiton products or grafted saponification products of ethylene-vinyl acetate copolymers for powder coating compositions or vibration-damper compositions (JP-B-47-10529 and JP-A-61-247766 and 61-24445). However, according to these known methods, adhesion to fibrous materials, metals and glasses is insufficient and therefore, troublesome means of inserting other resins of high adhesion strength are employed and improvement as to this point has been requested.

The present inventors have conducted intensive research on employing saponification products or grafted saponification products of ethylene-vinyl acetate copolymers for the above-mentioned uses and for adhesives for construction such as aluminum honeycombs. As a result, they have found that compositions excellent in adhesion strength, peel strength and impact strength can be obtained by adding a specific polycarboxylic acid or an anhydride thereof to the saponification products or grafted saponification products of ethylene-vinyl acetate copolymers. Thus, the present invention has been accomplished.

The present invention relates to an ethylene-vinyl acetate copolymer composition which comprises a saponification product or a grafted saponification product of ethylene-vinyl acetate copolymers and at least one compound selected from aliphatic or aromatic polycarboxylic acids and anhydrides thereof.

The present invention will be explained in detail.

The saponification products of ethylene-vinyl acetate copolymers used in the present invention are those which are prepared by saponification of known ethylene-vinyl acetate copolymers (hereinafter referred to as "EVA") by known processes and the grafted saponification products are those which are prepared by grafting the saponification products by known processes.

EVA used in the present invention are preferably those which vinyl acetate content is 5 to 80% by weight, preferably 10 to 55% by weight and have a melt index (ASTMD-1238) in the range of 0.5 to 500 g/10 min.

Saponification of the EVA can be carried out by dissolving it in an organic solvent or in the form of pellets or powders. As examples of the saponification processes, mention may be made of one which comprises dissolving EVA in aromatic hydrocarbons such as xylene, toluene, and benzene, saponifying it with an alkali catalyst, adding a poor solvent such as methanol to the reaction system to precipitate the reaction product and fractionating it to obtain a saponification product and one which comprises dispersing powders or pellets of EVA in a low boiling alcohol such as methanol, ethanol or isopropanol, saponifying EVA with an alkali catalyst, removing the low boiling alcohol and the catalyst by filtration after completion of the reaction, and washing the reaction product with a low boiling alcohol to obtain a saponification product. The alkali catalysts used in the reaction include, for example, alcoholates of alkali metals, especially sodium methylate and sodium ethylate and hydroxides of alkali metals, especially sodium hydroxide and potassium hydroxide.

Saponification degree of the saponification products of ethylene-vinyl acetate copolymers (the saponification products will be hereinafter referred to as "EVOH") varies depending on use, but is normally at least 10%, preferably at least 30%. Especially, as adhesives for construction or vibration damping which require peel strength, it is preferably in the range of 10 to 80% and more preferably in the range of 20 to 70%.

Grafting is also carried out by known processes such as those described in Rev. Roum. Chim., 1970, 15(2), P.239-245 and Advan. Chem. Ser., 1969, No.91, P477-488. Specifically, EVOH obtained by the above processes is dissolved in an aromatic hydrocarbon solvent such as xylene or benzene and is grafted with an ethylenically unsaturated carboxylic acid or an anhydride thereof using polymerization initators such as hydroperoxides, e.g., t-butyl hydroperoxide and cumene hydroperoxide, dialkyl peroxides, e.g., benzoyl peroxide and methyl ethyl ketone peroxide, diacyl peroxides, alkylidene peroxides and azobisisobutyronitrile, thereby to obtain a grafted saponification product of ethylene-vinyl acetate copolymers (hereinafter referred to as "EVOH-g-COOH"). Alternatively, the saponification product in the form of powder or pellet obtained in heterogeneous system may be dispersed in a low boiling alcohol and then grafted with an ethylenically unsaturated carboxylic acid or an anhydride thereof using a polymerization initiator.

The ethylenically unsaturated carboxylic acids or anhydrides thereof used for grafting include, for example, acrylic acid, methacrylic acid, maleic acid, fumaric acid, crotonic acid, itaconic acid, citraconic acid, maleic anhydride, itaconic anhydride, and citraconic anhydride. These monomers may be used singly or in combination with other ethylenically unsaturated monomers such as styrene, acrylic acid and esters thereof.

Reaction temperature for grafting may be higher than the decomposition beginning temperature of the radical initiators. Grafting degree is not critical and is preferably in the range of 0.1 to 15% by weight.

The aliphatic or aromatic polycarboxylic acids or anhydrides thereof used in the present invention are saturated or unsaturated aliphatic polycarboxylic acids of 2 to 10 carbon atoms, aromatic polycarboxylic acids of 8 to 20 carbon atoms or anhydrides of these polycarboxylic acids and derivatives including esters such as polycarboxylic acids with polyhydric alcohols, such as alkylene glycols.

Examples thereof are malonic acid, adipic acid, glutaric acid, sebacic acid, maleic acid, fumaric acid, phthalic acid, isophthalic acid, terephthalic acid, trimellitic acid, pyromellitic acid or anhydrides thereof, diesters of pyromellitic acid or anhydrides thereof with ethylene glycol, triesters of pyromellitic acid or anhydrides thereof with glycerin, and 3,3',4,4'-benzophenonetetracarboxylic acid anhydrides. Among those, especially preferred are maleic anhydride, trimellitic anhydride, itaconic acid, pyromellitic anhydride, diesters of these acids or anhydrides thereof with ethylene glycol, triesters of these acids or anhydrides thereof with glycerin, and 3,3',4,4'-benzophenonetetracarboxylic acid anhydrides. These aliphatic or aromatic polycarboxylic acids or anhydrides thereof may be used singly or in combination of two or more.

Method for containing the apliphatic or aromatic polycarboxylic acids of anhydrides thereof in EVOH or EVOH-g-COOH varies depending on uses of the composition and is not critical and they can be mixed or melt mixed in the form suitable for actual use. Specifically, the following methods are preferred.

That is, when the composition is used as so-called reaction type hot-melt adhesives, the polycarboxylic acids or anhydrides thereof are melt mixed with EVOH or EVOH-g-COOH at low temperatures, preferably 120° C. or lower.

Then, the mixture is molded into films, sheets, powders or pellets. In the use thereof as adhesives, these molded products are reheated to complete the reaction and are used, for example, as reaction type hot-melt adhesives.

Furthermore, when the composition is used for adhesive inner linings, it is used in the form of powder, film or pellet and the resin as adhesives (hereinafter referred to as "adhesive resin") in this case is in the form of random powders, film and dots and applied to an inner lining base fabric. This is used as the adhesive inner lining.

Therefore, it is desired to add the aliphatic or aromatic polycarboxylic acids or anhydrides thereof by a method suitable for the shape in use. Specifically, when adhesive resin is in the form of a powder, in the case of the polycarboxylic acid added being in the form of a powder, these may be mixed in the form of powder at room temperature and in the case of the polycarboxylic acid added being in the resinous form, this is ground into powders and then these may be mixed in the form of a powder at room temperature. When the adhesive resin is in the form of a pellet, this is melt mixed with EVOH or EVOH-g-COOH at low temperatures, preferably 100° C. or lower.

When the compositon is used for coating compositions, for example, powder coating composition, such powder coating composition can be prepared by adding optionally pigments such as titanium oxide and carbon black, fillers such as talc and calcium carbonate, stabilizers such as Irganox (tradename) and Tinuvin (tradename), and leveling agents such as acrylic acid leveling agents and silicone leveling agents to the composition comprising EVOH or EVOH-g-COOH and the polycarboxylic acids or anhydrides thereof, melt kneading the mixture by extruder, and then grinding or freeze-grinding the kneaded product. Alternatively, after kneaded by heating rolls, the kneaded product may be ground. Any method known per se can be employed for coating the resulting powder coating composition on the surface of materials to be coated. For example, there may be employed electrostatic coating, fluidization dip coating, and flame spray coating.

Addition amount of the aliphatic or aromatic polycarboxylic acid to EVOH or EVOH-g-COOH may vary depending on saponification degree and is normally in the range of 0.001 to 20% by weight, preferably 0.01 to 10% by weight based on EVOH or EVOH-g-COOH.

The ethylene-vinyl acetate copolymer composition of the present invention may further contain, depending on its use, inorganic fillers such as aluminum hydroxide, silica sand, clay, $SiO_2$ balloons, glass balloons, graphite, silicon carbide, and aluminum oxide and organic fillers such as walnut shell flours and polyethylene powders. Moreover, it is also possible depending the object to add known additives such as colorants, lubricants, other fillers, tackifiers, plasticizers, process oils, stabilizers, dehydrating agents, antifoaming agents and antioxidants.

As fibrous materials to which the hot-melt adhesives for fibrous materials of the present invention are applied, mention may be made of various fabrics comprising regenerated fibers, semisynthetic fibers, synthetic fibers and inorganic fibers such as polynosic, rayon, acetate, nylon, polyester, acrylic, polyurethane and glass fibers and natural fibers such as cotton, hemp, silk and wool fibers and blends thereof. The fabrics include woven fabrics, knitted fabrics, nonwoven fabrics, felts and the like.

The ethylene-vinyl acetate copolymer compositions of the present invention are especially useful as structural hot-melt adhesives. For example, they are widely used in industrial fields of automobiles, aircrafts, building materials, clothing, and communication as adhesives used between various substrates such as glass to glass, metal to metal, glass to metal, glass to plastic, metal to plastic, and fiber to plastic.

Moreover, the ethylene-vinyl acetate copolymer compositions of the present invention can be used as coating compositions for glasses, metals and plastics and have excellent properties especially as powder coating compositions.

Furthermore, the ethylene-vinyl acetate copolymer compositions of the present invention have especially good vibration-damping properties and are excellent in adhesion strength and thus can be suitably used as vibration damping resin compositions. As mentioned in "Iron and Steel", 72(1986), No. 10, P1575–1581, it is generally known as to vibration-damping properties that mechanical loss tan$\delta$ obtained by measuring viscoelasticity of resin compositions has a close relation with vibration-damping properties. From the results of measurement of tan$\delta$ of many resin compositions, it has been assumed that resin compositions having a tan$\delta$ of at least 0.1 have good vibration-damping properties (JP-A-3-7792) and the compositions of the present inveniton satisfy these requirements and have excellent adhesion strength.

Furthermore, the ethylene-vinyl acetate copolymer compositions of the present invention are excellent especially as adhesives between honeycomb structural materials such as aluminum honeycomb cores and paper honeycomb cores and surface materials.

Moreover, the ethylene-vinyl acetate copolymer compositions of the present invention are high in peel strength and excellent in dry-cleaning resistance and home laundry resistance and can be preferably used as hot-melt adhesives for fibrous materials.

Besides, the ethylene-vinyl acetate copolymer compositions of the present invention can be applied to the fields of elastomeric grinding stone and nonwoven fabrics and in addition can be preferably used for compatibilizing agents of polymer alloys and the like.

The compositions of the present invention have high peel strength and excellent impact strength, vibration-damping properties and heat resistance and are especially excellent as structural adhesives, adhesives for fibers and powder coating compositions. The composition of the present invention has especially superior effects as reaction type hot-melt adhesives and coating compositions. Furthermore, the compositions of the present invention are high in peel strength and excellent in dry-cleaning resistance and home laundry resistance and excellent as hot-melt adhesives for fibrous materials.

The present invention will be illustrated by the following nonlimiting examples, in which "part" are by weight.

SYNTHESIS EXAMPLE 1

Synthesis of EVOH by Homogeneous Reaction

A 10 liter flask was provided with a stirrer, a thermometer, a condenser and a nitrogen-gas introduction pipe and atmosphere therein was replaced with nitrogen gas. Then, in this flask were charged 3000 parts of xylene, 1000 parts of methanol and 1000 parts of EVA (vinyl acetate content: 40% by weight and MI: 60 g/10 min) and heated to 45°–50° C. After it was confirmed that EVA was completely dissolved, 35 parts of 28% sodium methoxide-methanol solution was added and reaction was allowed to proceed for 60 minutes at 45°–50° C. Thereafter, 270 parts of water was added to terminate the reaction and the reaction mixture was cooled to room temperature. It was taken out and introduced into a mixer in which 2500 parts of methanol was previously filled and polymer was taken out by reprecipitation method. The resulting saponified polymer had a saponification degree of 55%.

SYNTHESIS EXAMPLE 2

Synthesis of EVOH by Heterogeneous Reaction

A 10 liter flask was provided with a stirrer, a thermometer, a condenser and a nitrogen-gas introduction pipe and atmosphere therein was replaced with nitrogen gas. Then, in this flask were charged 6000 parts of methanol and 2500 parts of pelletized EVA (vinyl acetate content: 40% by weight and MI: 60 g/10 min). Thereto was added 160 parts of 28% sodium methoxide-methanol solution at 30° C. or less and reaction was allowed to proceed for 5 hours at 45°–50° C. Thereafter, the reaction mixture was cooled to 40° C. or less and filtrated to fractionate pellets and the reaction product was taken out and washed twice with 6000 parts of methanol to obtain EVOH having a saponification degree of 53%.

SYNTHESIS EXAMPLE 3

Synthesis of EVOH-g-COOH by Homogeneous Reaction

A 1 liter flask was provided with a stirrer, a thermometer, a condenser and a nitrogen-gas introduction pipe and atmosphere therein was replaced with nitrogen gas. Then, 500 parts of xylene and 100 parts of EVOH obtained in Synthesis Example 1 were charged in the flask and heated to 120° C. to homogeneously dissolve EVOH, followed by introducing 1.5 parts of acrylic acid and then 0.2 part of azobisisobutyronitrile (hereinafter referred to as "AIBN"). The solution was kept for 1 hour and then cooled to 50° C. Thereafter, methanol was introduced therein under stirring to precipitate EVOH-g-COOH.

SYNTHESIS EXAMPLE 4

Synthesis of EVOH-g-COOH by Heterogeneous Reaction

A 1 liter flask was provided with a stirrer, a thermometer, a condenser and a nitrogen-gas introduction pipe and atmosphere therein was replaced with nitrogen gas. Then, 500 parts of methanol and 100 parts of EVOH obtained in Synthesis Example 2 were charged in the flask and heated to 50° C. to homogeneously dissolve EVOH, followed by introducing 2.5 parts of a acrylic acid and then 0.2 part of AIBN. The solution was kept for 9 hours and then cooled to 40° C. and thereafter, polymer was filtered off to precipitate EVOH-g-COOH.

SYNTHESIS EXAMPLE 5

Synthesis of EVOH by Heterogeneous Reaction

EVOH of 96% in saponification degree was obtained in the same manner as in Synthesis Example 2 except that the reaction of pelletized EVA (vinyl acetate content: 40% by weight and MI: 60 g/10 min) with sodium methoxide-methanol solution was carried out at 45° to 50° C. for 12 hours and not for 5 hours.

EXAMPLES 1 TO 5

Production of the following samples using EVOH or EVOH-g-COOH synthesized by the above processes and measurement of adhesion strength thereof and others were carried out.

Production of Sample

Preparation of Pellets

EVOH or EVOH-g-COOH obtained in the above synthesis examples was melt mixed with the given amount of pyromellitic anhydride as shown in Table 1 by a laboratory small extruder at 100° C. to prepare pellets.

Production of Sheet

The pellets obtained above were molded into a sheet of 0.2 mm thick by a hot press molding machine at a molding temperature of 110° to 12° C.

Measurement of Adhesion Strength

Sample for Measurement of Peel Strength

The sheet was sandwiched between two aluminum sheets of 0.3×25×150 mm (JIS H 4000 A1050P) and these were allowed to adhere to each other under contact pressure at 170° C. for 10 minutes.

Sample for Heat Resistance Test

The sheet of 0.2 mm thick was sandwiched between two aluminum sheets of 1.5×25×100 mm in an area of 25×25 mm and these were allowed to adhere to each other under contact pressure at 170° C. for 10 minutes.

Measurement of Peel Strength

The sandwiched sample was subjected to T-peel test at a cross-head speed of 50 mm/min in a thermo-hygrostat of 25° C. using an autograph manufactured by Shimadzu Seisakusho Ltd. (unit: kg/inch).

Measurement of Heat Resistance

A weight of 25 g was suspended at an end of the above sample for heat resistance test and the sample was prependicularly suspended for 30 minutes in an oven of 100° C. and thereafter, slipping of the test piece was measured. (unit: mm).

The results are shown in Table 1. For comparison, the same tests were conducted on a sample which did not contain the polycarboxylic acid or anhydride thereof of the present invention and the results are also shown in Table 1 as Comparative Example 1.

TABLE 1

|  | Copolymer | Saponification degree (%) | Polycarboxylic acids and amount added*1 (part) | Peel strength kg/inch | Heat resistance mm |
|---|---|---|---|---|---|
| Example 1 | Synthesis Example 1 (EVOH) | 55 | Pyromellitic anhydride 0.5 | 25 | 0 |
| Example 2 | Synthesis Example 2 (EVOH) | 53 | Pyromellitic anhydride 1.0 | 24 | 0 |
| Example 3 | Synthesis Example 3 (EVOH-g-COOH) | 55 | Pyromellitic anhydride 0.5 | 45 | 0 |
| Example 4 | Synthesis Example 4 (EVOH-g-COOH) | 53 | Pyromellitic anhydride 1.0 | 48 | 0 |
| Example 5 | Synthesis Example 5 (EVOH-g-COOH) | 53 | Rikacid TMEG*2 1.0 | 38 | 0 |
| Comparative Example 1 | Synthesis Example 1 (EVOH) | 55 | No | 8 | 5 |

*1 Addition amount of the polycarboxylic acids shown in Table 1 is based on 100 parts of EVOH or EVOH-g-COOH.
*2 Rikacid TMEG is a tradename for ethylene glycol bis(anhydrotrimellitate) manufactured by Shin Nihon Rika Co.

EXAMPLES 6–17

EVOH-g-COOH of various saponification degrees were synthesized in nearly the same manner as in Synthesis Example 3 and the given polycarboxylic acids or anhydrides thereof were added as in Examples 1–5. The results are shown in Table 2 and Table 3.

TABLE 2

|  | Graft monomer and amount added*3 (part) | Saponification degree (%) | Polycarboxylic acids and amount added*4 (part) | Peel strength Kg/inch |
|---|---|---|---|---|
| Example 6 | Acrylic acid 2.50 | 44.5 | Pyromellitic anhydride 0.5 | 35.5 |
| Example 7 | Acrylic acid 2.50 | 45.3 | Trimellitic anhydride 0.5 | 24.6 |
| Example 8 | Acrylic acid 2.50 | 45.3 | Itaconic acid 0.5 | 20.0 |
| Example 9 | Acrylic acid 2.50 | 45.3 | Maleic anhydride 0.5 | 26.5 |
| Example 10 | Acrylic acid 2.50 | 75.0 | Maleic anhydride 0.5 | 18.0 |

*3 Amount of graft monomer shown in Tables 2 and 3 is based on 100 parts of EVOH.
*4 Addition amount of the polycarboxylic acids shown in Tables 2 and 3 is based on 100 parts of EVOH-g-COOH.

TABLE 3

|  | Graft monomer and amount added*3 (part) | Saponification degree (%) | Polycarboxylic acids and amount added*4 (part) | Peel strength Kg/inch |
|---|---|---|---|---|
| Example 11 | Methacrylic acid 2.50 | 41.9 | Pyromellitic anhydride 0.5 | 30.0 |
| Example 12 | Methacrylic acid 2.50 | 41.9 | Trimellitic anhydride 0.5 | 18.0 |
| Example 13 | Methacrylic acid 2.50 | 62.6 | Pyromellitic anhydride 0.5 | 28.0 |
| Example 14 | Maleic anhydride 2.50 | 48.0 | Pyromellitic anhydride 0.1 | 14.0 |
| Example 15 | Maleic anhydride 2.50 | 48.0 | Pyromellitic anhydride 0.3 | 15.5 |
| Example 16 | Maleic anhydride 2.50 | 48.0 | Pyromellitic anhydride 0.5 | 18.5 |
| Example 17 | Sodium acrylate 2.50 | 52.0 | Pyromellitic anhydride 0.3 | 18.0 |

EXAMPLE 18

EVOH obtained in Synthesis Example 5 was ground and powders of larger than 20 meshes were removed by a sieve to obtain powdery EVOH of 168 microns in average particle size. To 100 parts by weight of this EVOH was added 1 part by weight of pyromellitic anhydride and these were sufficiently mixed to well disperse the pyromellitic anhydride. The mixture was charged up to 45 cm in height in a fluidized bed box of 30 cm in width, 80 cm in length and 100 cm in height and a fluidized bed was formed with keeping a height of 70 cm by a clean air.

Then, a sandblasted steel sheet of 90×110×2 mm as a test piece which had been left for 3 minutes in a heating furnace previously heated to an internal temperature of 250° C. was immediately dipped in the above fluidized bed and kept for 3 seconds. The coated test piece was taken out and after 20 seconds, this was repidly cooled by dipping in cold water. The coat on the test piece was smooth and had gloss.

The coat on the steel sheet was subjected to crosscut test. That is, the coat was cut crosswise at an interval of 1 mm by a knife so as to form 10 squares in breadthwise direction and 10 squares in lengthwise direction, totally 100 squares. A cellophane tape was brought into close contact with the squares and then the tape was quickly peeled from the steel sheet in perpendicular direction. The number of squares peeled off by the tape was 0/100, which indicates high adhesion of the coat.

For comparison, a coat test piece was prepared in the same manner as above without using pyromellitic anhydride and was subjected to the same cross-cut test. 7/100 of squares were peeled off by the cellophane tape.

EXAMPLE 19

EVOH obtained in Synthesis Example 1 was ground and powders of larger than 20 meshes were removed by a sieve to obtain powdery EVOH of 143 microns in average particle size. To 100 parts by weight of this EVOH was added 1 part by weight of pyromellitic anhydride and these were sufficiently mixed to well disperse the pyromellitic anhydride. The mixture was charged up to 45 cm in height in a fluidized bed box of 30 cm in width, 80 cm in length and 100 cm in height and a fluidized bed was formed with keeping a height of 70 cm by a clean air.

Then, a sandblasted steel sheet of $90 \times 110 \times 2$ mm as a test piece which had been left for 3 minutes in a heating furnace previously heated to an internal temperature of 250° C. was immediately dipped in the above fluidized bed and kept for 3 seconds. The coated test piece was taken out and after 20 seconds, this was rapidly cooled by dipping in cold water. The coat on the test piece was smooth and had gloss.

The coat on the steel sheet was subjected to crosscut test. That is, the coat was cut crosswise at an interval of 1 mm by a knife so as to form 10 squares in breadthwise direction and 10 squares in lengthwise direction, totally 100 squares. A cellophane tape was brought into close contact with the squares and then the tape was quickly peeled from the steel sheet in perpendicular direction. The number of squares peeled off by the tape was 0/100, which indicates high adhesion of the coat.

For comparison, a coat test piece was prepared in the same manner as above without using pyromellitic anhydride and was subjected to the same crosscut test. 12/100 of squares were peeled off by the cellophane tape.

EXAMPLE 20

To 100 parts by weight of EVOH obtained in Synthesis Example 2 was added 1 part by weight of pyromellitic anhydride and these were melt mixed by a small extruder at 100° C. to prepare pellets. The resulting pellets were molded into a sheet of 1 mm thick by a hot press molding machine at a molding temperature of 110° C.

Viscoelasticity of this sheet was measured by FT Rheospctra DVE-V4 (manufactured by Rheology Co.) to find that the temperature range in which tanδ exceeded 0.1° was $-15°$ C. This means good vibration-damping properties.

A sheet of 80 microns thick was prepared from the above pellets and was sandwiched between mild steel sheets of 0.3 mm thick and these were press bonded at 190° C. for 5 minutes under 30 kg/cm$^2$. The adhesive force was 28 kg/inch in terms of peel strength.

For comparison, a sheet was produced in the same manner as above without using pyromellitic anhydride. Adhesive force of this sheet was 11 kg/inch in terms of peel strength.

EXAMPLE 21

To 100 parts by weight of EVOH-g-COOH obtained in Synthesis Example 4 was added 0.5 part by weight of pyromellitic anhydride and these were melt mixed by a small extruder at 100° C. to prepare pellets. The resulting pellets were molded into a sheet of 1 mm thick by a hot press molding machine at a molding temperature of 100° C.

Viscoelasticity of this sheet was measured by FT Rheospctra DVE-V4 (manufactured by Rheology Co.) to find that the temperature range in which tanδ exceeded 0.1° was $-17°$ C. This means good vibration-damping properties.

A sheet of 80 microns thick was prepared from the above pellets and was sandwiched between mild steel sheets of 0.3 mm thick and these were press bonded at 190° C. for 5 minutes under 30 kg/cm$^2$. The adhesive force was 42 kg/inch in terms of peel strength.

For comparison, a sheet was produced in the same manner as above without using pyromellitic anhydride. Adhesive force of this sheet was 18 kg/inch in terms of peel strength.

SYNTHESIS EXAMPLE 6

Synthesis of EVOH by Homogeneous Reaction

A 10 liter flask was provided with a stirrer, a thermometer, a condenser and a nitrogen-gas introduction pipe and atmosphere therein was replaced with nitrogen gas. Then, in this flask were charged 3000 parts of xylene, 1000 parts of methanol and 1000 parts of EVA (vinyl acetate content: 40% by weight and MI: 60 g/10 min).and heated to 45° to 50° C. After it was confirmed that EVA was completely dissolved, 35 parts of 28% sodium methoxide-methanol solution was added and reaction was allowed to proceed for 120 minutes at 45° to 60° C. Thereafter, 270 parts of water was added to terminate the reaction and the reaction mixture was cooled to room temperature. It was taken out and introduced into a mixer in which 2500 parts of methanol was previously filled and powdery polymer was obtained by reprecipitation method. The resulting saponified polymer had a saponification degree of 91%.

SYNTHESIS EXAMPLE 7

Synthesis of EVOH by Heterogeneous Reaction

A 10 liter flask was provided with a stirrer, a thermometer, a condenser and a nitrogen-gas introduction pipe and atmosphere therein was replaced with nitrogen gas. Then, in this flask were charged 6000 parts of methanol and 2500 parts of pelletized EVA (vinyl acetate content: 40% by weight and MI: 60 g/10 min). Thereto was added 160 parts of 28% sodium methoxide-methanol solution at 30° C. or less and reaction was allowed to proceed for 15 hours at 45° to 50° C. Thereafter, the reaction mixture was cooled to 40° C. or less and filtrated to fractionate pellets and the reaction product was taken out and washed twice with 6000 parts of methanol to obtain EVOH having a saponification degree of 92%.

SYNTHESIS EXAMPLE 8

Synthesis of EVOH-g-COOH by Homogeneous Reaction

A 1 liter flask was provided with a stirrer, a thermometer, a condenser and a nitrogen-gas introduction pipe and atmosphere therein was replaced with nitrogen gas. Then, 500 parts of xylene and 100 parts of EVOH obtained in Synthesis Example 6 were charged in the flask and heated to 120° C. to homogeneously dissolve EVOH, followed by introducing 1.5 parts of acrylic acid and then 0.2 part of AIBN. The solution was kept for 1 hour and then cooled to 50° C. Thereafter, methanol was introduced thereinto under stirring to precipitate EVOH-g-COOH.

SYNTHESIS EXAMPLE 9

Synthesis of EVOH-g-COOH by Heterogeneous Reaction

A 1 liter flask was provided with a stirrer, a thermometer, a condenser and a nitrogen-gas introduction pipe and atmosphere therein was replaced with nitrogen gas. Then, 500 parts of methanol and 100 parts of EVOH obtained in Synthesis Example 7 were charged in the flask and heated to 50° C. to homogeneously dissolve EVOH, followed by introducing 2.5 parts of acrylic acid and then 0.2 part of AIBN. The solution was kept for 9 hours and then cooled to 40° C. and thereafter, polymer was filtered off to precipitate EVOH-g-COOH.

EXAMPLES 22 TO 26

Samples were prepared in the following manner using EVOH or EVOH-g-COOH synthesized in Synthesis Examples 6-9 and peel strength of these samples were measured. The results are shown in Tables 4-6. A sample was prepared in the same manner as above without using the polycarboxylic acid of the present invention and the results thereon are also shown in Tables 4-6 as Comparative Example 2.

Production of Sample

Preparation of Powder

When EVOH or EVOH-g-COOH obtained in the above synthesis examples was in the form of pellets, the pellets were ground and homogeneously mixed in the form of powders with the given amount of the polycarboxylic acid shown in Tables 4-6.

Preparation of Adhesive Inner Lining as Test Piece

Two cotton broadcloths #60 of 15 cm×20 cm were prepared and the above-mentioned powders were uniformly sprinkled on one of the broadcloths in an amount of 20 g/m$^2$ and this broadcloth was put in an oven of 120° C. for 1 minute. After the adhesive resin was half-molten and the powders no longer flew off, another cotton broadcloth was superposed thereon and these were allowed to adhere to each other under a pressing pressure of 250 g/cm$^2$, at an adhesion temperature of 180° C. for a pressing time of 10 seconds. This was cut to a size of 2.5 cm×20 cm and the sample was subjected to the following peel strength tests.

Measurement of Adhesion Strength

Dry-Cleaning Peeling Test (DC)

Dry-cleaning peeling test was carried out in accordance with JIS L1089-1970.

Home Laundry Peeling Test (HL)

Home laundry peeling test was carried out in accordance with JIS L1089-1970.

Measurement of Peel Strength

T-peel test was conducted in a thermohygrostat of 25° C. at a crosshead speed of 200 mm/min using Autograph manufactured by Shimadzu Seisakusho Ltd. (unit: kg/inch).

TABLE 4

| | Copolymers | | Polycarboxylic acids | | DC*5 g/inch | HL*6 g/inch | Initital adhesion strength g/inch |
|---|---|---|---|---|---|---|---|
| | Synthesis Example No. | Saponification degree(%) | | Amount*7 | | | |
| Example 22 | Synthesis Example 6 (EVOH) | 91 | Pyromellitin anhydride | 0.5 | 2680 | 1750 | 2450 |
| Example 23 | Synthesis Example 7 (EVOH) | 92 | Pyromellitin anhydride | 1.0 | 2860 | 1950 | 2350 |
| Example 24 | Synthesis Example 8 (EVOH-g-COOH) | 91 | Pyromellitin anhydride | 0.5 | 2620 | 1700 | 2500 |
| Example 25 | Synthesis Example 9 (EVOH-g-COOH) | 92 | Pyromellitin anhydride | 1.0 | 2250 | 1950 | 2450 |
| Example 26 | Synthesis Example 9 (EVOH-g-COOH) | 92 | Rikacid TMEG*8 | 1.0 | 1300 | 950 | 1900 |
| Comparative Example | Synthesis Example 6 (EVOH) | 91 | — | — | 750 | 650 | 1800 |

TABLE 4-continued

| Copolymers Synthesis Example No. | Saponification degree(%) | Polycarboxylic acids | Amount[7] | DC[5] g/inch | HL[6] g/inch | Initial adhesion strength g/inch |
|---|---|---|---|---|---|---|
| 2 | | | | | | |

[5]DC means dry-cleaning peeling test.
[6]HL means home laundry peeling test.
[7]Amount of the polycarboxylic acids shown in Table 4 is based on 100 parts of EVOH or EVOH-g-COOH.
[8]Rikacid TMEG is a tradename of ethylene glycol bis(anhydrotrimellitate) manufactured by Shin Nihon Rica Co.

EXAMPLES 27–40

EVOH-g-COOH of various saponification degrees were prepared in nearly the same manner as in Synthesis Example 8 and the given amount of the polycarboxylic acid as shown in Tables 5 and 6 was added thereto. The results of measurements are shown in Tables 5 and 6.

SYNTHESIS EXAMPLE 10

A 10 liter flask was provided with a stirrer, a thermometer, a condenser and a nitrogen-gas introduction pipe and atmosphere therein was replaced with nitrogen gas. Then, in this flask were charged 6000 parts of methanol and 2500 parts of pelletized EVA (vinyl acetate content: 41% by weight and MI: 60 g/10 min). Thereto

TABLE 5

| | Graft monomers | | Polycarboxylic acids | | Initial adhesion strength g/inch | DC[5] g/inch | HL[6] g/inch |
|---|---|---|---|---|---|---|---|
| | (amount)[8] | Saponification degree(%) | | Amount[7] | | | |
| Example 27 | Acrylic acid (2.5 parts) | 75 | Trimellitic anhydride | 0.5 | 2350 | 2450 | 2320 |
| Example 28 | Acrylic acid (2.5 parts) | 75 | Trimellitic anhydride | 1.0 | 2400 | 2510 | 2330 |
| Example 29 | Acrylic acid (2.5 parts) | 75 | Itaconic acid | 0.5 | 1830 | 1950 | 1860 |
| Example 30 | Acrylic acid (2.5 parts) | 75 | Maleic anhydride | 0.5 | 1780 | 1850 | 1770 |
| Example 31 | Acrylic acid (2.5 parts) | 75 | Maleic anhydride | 1.0 | 2050 | 2250 | 2160 |
| Example 32 | Methacrylic acid (2.5 parts) | 82 | Pyromellitic anhydride | 0.5 | 2260 | 2450 | 2380 |
| Example 33 | Methacrylic acid (2.5 parts) | 82 | Pyromellitic anhydride | 1.0 | 2150 | 2200 | 2040 |

[8]Amount of graft monomer shown in Tables 5 and 6 is based on 100 parts of EVOH.

TABLE 6

| | Graft monomers | | Polycarboxylic acids | | Initial adhesion strength g/inch | DC[5] g/inch | HL[6] g/inch |
|---|---|---|---|---|---|---|---|
| | (amount)[8] | Saponification degree(%) | | Amount[7] | | | |
| Example 34 | Methacrylic acid (2.5 parts) | 82 | Pyromellitic anhydride | 0.5 | 2350 | 2430 | 2180 |
| Example 35 | Acrylic acid (2.5 parts) | 93 | Trimellitic anhydride | 1.0 | 2150 | 2250 | 2220 |
| Example 36 | Acrylic acid (2.5 parts) | 93 | Trimellitic anhydride | 0.5 | 2240 | 2550 | 2620 |
| Example 37 | Acrylic acid (2.5 parts) | 93 | Itaconic acid | 0.5 | 1670 | 1830 | 1800 |
| Example 38 | Acrylic acid (2.5 parts) | 93 | Maleic anhydride | 0.5 | 2140 | 2350 | 2270 |
| Example 39 | Acrylic acid (2.5 parts) | 93 | Maleic anhydride | 1.5 | 2250 | 2360 | 2230 |
| Example 40 | Methacrylic acid (2.5 parts) | 95 | Pyromellitic anhydride | 0.5 | 2300 | 2400 | 2420 | was added 160 parts of a 28% sodium methoxide-methanol solution at 30° C. or less and reaction was allowed to proceed for 7 hours at 45°-50° C. Thereafter, the reaction mixture was cooled to 40° C. or less and filtrated to fractionate pellets and the reaction product was taken out and washed twice with 6000 parts of methanol to obtain EVOH having a saponification degree of 63%.

SYNTHESIS EXAMPLE 11

EVOH of 96% in saponification degree was obtained in the same manner as in Synthesis Example 10 except that the reaction of pelletized EVA (vinyl acetate content: 41% by weight and MI: 60 g/10 min) with sodium methoxide-methanol solution was carried out at 45° to 50° C. for 12 hours in place of 7 hours.

EXAMPLES 41 TO 42

Production of the following samples using EVOH synthesized by the above processes to which 0.5 PHR of pyromellitic anhydride and measurement of adhesion strength thereof were carried out. In comparative examples shown for comparison, EVOH synthesized above were used as they were.

Production of Sample

Preparation of Sheet

The EVOH obtained above was molded into a sheet of 0.2 mm thick by a hot press molding machine at a molding temperature of 110° to 130° C.

Measurement of Adhesion Strength

Sample for Measurement of Peel Strength

The sheet was sandwiched between two aluminum sheets of 0.3×25×150 mm (JIS H 4000 A1050P) and these were allowed to adhere to each other under contact pressure at 170° C. for 10 minutes.

Measurement of Peel Strength

This test piece was subjected to T-peel test at a cross-head speed of 50 mm/min in a thermostatic chamber of 25° C. using an autograph manufactured by Shimadzu Seisakusho Ltd.

Measurement of Shear Adhesive Strength

Two soft steel sheets of 1.6×25×100 mm (JIS G 3141-SPCC SB) were superposed in such a manner that they partially overlapped each other in the central portion of 25×12.5 mm and the above molded sheet was put between the soft steel sheets in their overlapping portion. Then, they were allowed to adhere at 170° C. for 10 minutes under contact pressure.

Then, this test piece was subjected to shear adhesion test at a cross-head speed of 2.5 mm/min in a thermostatic chamber of 25° C. using an autograph manufactured by Shimadzu Seisakusho Ltd. The results are shown in Table 7.

TABLE 7

| | Copolymer | Saponification degree | Amount of Pyromellitic anhydride*[9] | Peel strength kg/25 mm | Shear adhesion strength kg/cm² |
|---|---|---|---|---|---|
| Example 41 | Synthesis example 10 | 63% | 0.5 | 25.5 | 130 |
| Comparative Example 3 | Synthesis example 10 | 63% | No | 18.5 | 125 |
| Example 42 | Synthesis example 11 | 96% | 0.5 | 17.0 | 180 |
| Comparative Example 4 | Synthesis example 11 | 96% | No | 5.3 | 172 |

*[9] Amount of the Pyromellitic anhydride shown in Table 7 is based on 100 parts of copolymer (EVOH).

Plane tensile strength of the molded sheets obtained in Examples 41 to 42 and Comparative Examples 3 and 4 in aluminum honeycomb was measured in the following manner.

Measurement of Plane Tensile Strength

An aluminum sheet having a size of 1.5×50×50 mm (JIS H4000 A1100P) manufactured by Japan Test Panel Co. was used as a surfacing material and AL-318-52-2P aluminum honeycomb manufactured by Showa Airplane Co. and cut to a size of 50×50 mm was used as a honeycomb core.

The surfacing material, the molded sheet and the honeycomb core were stacked in the form of a sandwich in the order of surfacing material/molded sheet/honeycomb core/molded sheet/surfacing material and were allowed to adhere to each other at 170° C. for 10 minutes under contact pressure.

Then, jigs were attached to the surfacing materials of the both ends and were nipped by autograph manufactured by Shimadzu Seisakusho Ltd. Plane tensile strength (initial strength) was measured in a thermostatic chamber of 25° C. at a cross-head speed of 5 mm/min.

Hot Water Resistance Test

Water was poured in a container and then the test piece was put therein and the container was closed. This container was placed in an oven of 100% RH and 60° C. to expose the test piece to this atmosphere. After lapse of a given period, plane tensile strength was measured in the same manner as above. The results are shown in Table 8.

Repeated Thermal Shock Test

The test piece was placed in a pan made of SUS and kept in an oven of 60° C. and 100% RH for 12 hours and was further exposed to −15° C. for 8 hours and then 65° C. for 12 hours (one cycle). After the test piece was subjected to a given number of cycles, plane tensile strength was measured in the same manner as above. The results are shown in Table 9.

TABLE 8

| | Hot water resistance test | |
|---|---|---|
| | plane tensile strength (kg/cm²) | |
| | Saponification degree | 0.5 PHR of pyromellitic anhydride added | No pyromellitic anhydride |
| | | (Example 41) | (Comparative Example 3) |
| Initial strength | 63% | 13.5 | 12.3 |
| 1000 hr | " | 13.8 | 10.9 |
| 2000 hr | " | 12.7 | 9.5 |
| 3000 hr | " | 13.2 | 9.0 |

TABLE 8-continued

Hot water resistance test

| | | plane tensile strength (kg/cm$^2$) | |
|---|---|---|---|
| | Saponification degree | 0.5 PHR of pyromellitic anhydride added | No pyromellitic anhydride |
| | | (Example 42) | (Comparative Example 4) |
| Initial strength | 96% | 21.5 | 19.8 |
| 1000 hr | " | 20.3 | 19.6 |
| 2000 hr | " | 22.8 | 17.3 |
| 3000 hr | " | 21.6 | 16.2 |

TABLE 9

Repeated thermal shock test

| | | plane tensile strength (kg/cm$^2$) | |
|---|---|---|---|
| | Saponification degree | 0.5 PHR of pyromellitic anhydride added | No pyromellitic anhydride |
| | | (Example 41) | (Comparative Example 3) |
| Initial strength | 63% | 25.5 | 19.8 |
| 6 cycles | " | 23.4 | 17.5 |
| 22 cycles | " | 22.5 | 15.5 |
| | | (Example 42) | (Comparative Example 4) |
| Initial strength | 96% | 21.2 | 19.4 |
| 6 cycles | " | 22.4 | 15.3 |
| 22 cycles | " | 22.7 | 13.7 |

What is claimed is:

1. An ethylene-vinyl acetate copolymer composition comprising a blend or melt kneaded product of
   (A) a saponification product of an ethylene-vinyl acetate copolymer or a grafted product of the saponification product and
   (B) at least one compound selected from the group consisting of pyromellitic anhydride, a diester of trimellitic anhydride with ethylene glycol, a triester of trimellitic anhydride with glycerol, a diester of pyromellitic anhydride with ethylene glycol, a triester of pyromellitic anhydride with glycerol and 3,3',4,4'-benzophenonetetracarboxylic acid anhydride.

2. An ethylene-vinyl acetate copolymer composition comprising a blend or melt-kneaded product of (A) a saponification product of an ethylene-vinyl acetate copolymer or a grafted product of the saponification product, and (B') a diester of trimellitic anhydride with ethylene glycol.

3. A composition according to claim 1 wherein (B) is present in an amount ranging from 0.001 to 20% by weight of (A).

4. A composition according to claim 2, wherein (B') is present in an amount ranging from 0.001 to 20% by weight of (A).

5. An ethylene-vinyl acetate copolymer composition comprising a blend or melt kneaded product of (A) a saponification product of an ethylene-vinyl acetate copolymer or a grafted product of the saponification product and (B) at least one compound selected from the group consisting of a diester of trimellitic anhydride with ethylene glycol, a triester of trimellitic anhydride with glycerol, a diester of pyromellitic anhydride with ethylene glycol, a triester of pyromellitic anhydride with glycerol, and 3,3',4,4'-benzophenonetetracarboxylic acid anhydride.

6. The ethylene-vinyl acetate copolymer composition according to claim 5 wherein the compound (B) is present in an amount ranging from 0.001 to 20% by weight based on the weight of the saponification product of an ethylene-vinyl acetate copolymer or a grafted product of the saponification product (A).

* * * * *